United States Patent [19]

Klank

[11] 4,335,703
[45] Jun. 22, 1982

[54] HEAT CONSERVATION AND STORAGE APPARATUS AND SYSTEM

[76] Inventor: Benno E. O. Klank, 5639 Jay Rd., Boulder, Colo. 80301

[21] Appl. No.: 217,226

[22] Filed: Dec. 17, 1980

Related U.S. Application Data

[63] Continuation of Ser. No. 968,905, Dec. 13, 1978, abandoned.

[51] Int. Cl.³ .............................................. F24B 7/00
[52] U.S. Cl. .................................... 126/121; 126/131; 126/132; 237/51
[58] Field of Search ............... 126/120, 121, 123, 126, 126/132, 130, 131, 135, 136, 143; 237/51

[56] References Cited

U.S. PATENT DOCUMENTS

| | | | |
|---|---|---|---|
| 513,842 | 1/1894 | Trieber | 126/132 |
| 1,391,394 | 9/1921 | Loyer | 126/132 |
| 2,046,051 | 6/1936 | Baruch et al. | 126/132 |
| 2,134,935 | 11/1938 | Winnett | 126/121 |
| 2,622,587 | 12/1952 | Dupler | 126/121 |
| 4,046,320 | 9/1977 | Johnson | 237/51 |
| 4,050,441 | 9/1977 | Horwinski | 126/121 |
| 4,050,626 | 9/1977 | Awalt | 126/121 |
| 4,127,103 | 11/1978 | Klank et al. | 126/450 |
| 4,131,231 | 12/1978 | Cleer | 126/164 |
| 4,174,700 | 11/1979 | Bartsch | 126/121 |
| 4,185,612 | 1/1980 | Briner | 237/51 |
| 4,193,387 | 3/1980 | Cline | 126/121 |

*Primary Examiner*—Daniel J. O'Connor
*Attorney, Agent, or Firm*—Earl C. Hancock

[57] ABSTRACT

Excess heat from a source such as a fireplace is absorbed into a liquid medium and transferred to storage for later use or to a distribution network for radiation at remote locations. The fireplace can be formed by heat conducting walls of a multi-chambered enclosure having an air guiding path for heating the air along with a liquid medium passing through the enclosure in a heat exchanger arrangement. The heated liquid medium can be stored and, when there is no combustion in the fireplace, returned to the fireplace enclosure for supplementary air heating. The liquid medium storage can include a tank having a pair of baffle plates in generally horizontal but diverging relation for producing heat layer stratification and separation of the liquid medium. Both cool and warm liquid medium are delivered between the baffle plates in proximity to the end of minimum vertical separation.

1 Claim, 12 Drawing Figures

HEAT CONSERVATION AND STORAGE APPARATUS AND SYSTEM

This is a continuation of application Ser. No. 968,905 filed Dec. 13, 1978, now abandoned.

BACKGROUND OF THE INVENTION

The present invention relates to apparatus and systems for conserving heat energy in a closed environment. More particularly, the present invention relates to apparatus and systems for retrieving excess heat as from a fireplace, for efficiently storing heat in a liquid medium, for distributing heat from a heat source or heat storage and for utilizing a fireplace for not only direct air and liquid medium heating but also for delayed air heating when there is no combustion in the fireplace. The present invention is particularly useful for heating of homes, buildings or other closed environments.

It has long been known that a relatively large percentage of combustion heat from fireplaces, furnaces and the like is lost with the flue gases. Thus jacketed fireboxes which pass cool air around the firebox walls and exhaust it to the room have been in use for many years. An example is the 1894 issued U.S. Pat. No. 513,842 by Treiber which included water coils passing through the air jacket to provide bath water heating. A more recent arrangement for fireplace heat recovery improvement is shown in U.S. Pat. No. 4,050,441 by Horwinski wherein air from the jacketed firebox is passed through a series of finned tubes traversing the flue before exhausting into the room. Others have suggested recovery of fireplace heat by water filled jackets so that the heated water can be transferred to storage and subsequently used for other purposes as in U.S. Pat. No. 2,046,051 by Baruch et al. Tortuous water pipe systems through heated firebox flue gases to warm water for transfer to remote locations is shown in U.S. Pat. No. 2,622,587 by Dupler. Another system using a water jacketed firebox to warm water for transfer to remote heat radiators is shown in U.S. Pat. No. 1,391,394 by Loyer. An arrangement for heating for heating water in pipes passing through side air chambers of an air jacketed type of firebox for transfer of the heated water to storage so that the warmed water can later be passed back through those pipes to warm the air in the side chambers is shown in U.S. Pat. No. 4,050,626 by Awalt.

Despite the various efforts to improve fireplace combustion heat recovery efficiency over the years, none has gained acceptance to any significant degree. However, the sharply enhanced concern for energy conservation of recent years has brought on renewed interest in the rudimentary air jacketed fireplace wherein heated air is released into the same room as the fireplace, these being sometimes referred to as heatolator systems. Such systems suffer the disadvantages of only slightly improving heat recovery efficiency while frequently exhausting more heat than is required for the room during the time there is a fire in the firebox. Although storage of at least some of the excess combustion heat through transfer of water heated in the firebox has been suggested as in the devices of Treiber, Baruch et al, Awalt and others, none of the prior art teaches acceptably efficient fireplace configurations which can be used to return the stored heat to the environment around the fireplace in an effective manner nor do they suggest such a fireplace that can be practically integrated into a heating system for a building or the like. Awalt mentions return of stored heat to the firebox chambers for radiation in the absence of combustion but the device shown by Awalt is inherently unsatisfactory for efficient heat storing or returning and further neither suggests nor is well suited for integration into a overall heat distribution system.

With the recent advent of increased interest in heat conservation, there has been a concurrent demand for more efficient heated water storage apparatus which will ensure that the warmest water possible is available for subsequent heat delivery purposes. One effort to improve tank storage efficiency is shown in FIG. 6 of U.S. Pat. No. 4,127,103 by Klank and Jensen wherein the storage tank is segregated into sections by baffles with the warmed water injected at the upper baffle and the cool return water injected at the lower baffle.

SUMMARY OF THE INVENTION

The inadequacies of the prior art to effectively harness the excess heat generation of fireplaces, to integrate fireplaces into heat distribution systems, and to efficiently store a heated liquid medium so that maximum heat radiation is available when needed, are all overcome by various features of the present invention.

One feature of the present invention is concerned with a fireplace heat exchanger wherein the firebox is formed by heat conducting walls of three interconnected enclosures. Cool air is introduced to the two enclosures which include the firebox sidewalls where it is partially heated and then delivered to the third or rear firebox wall forming enclosure. The warmed air is exhausted from the third enclosure into the environment requiring immediate heating and is also used to warm a heat transferring liquid medium conducted through a path within a heat exchanger contained in at least one of the enclosures. Preferably the air from the sidewall forming enclosures is delivered to the rearwall enclosure through a network of hollow members passing through the combustion area of the firebox. The sidewall enclosures can include baffles to obtain maximum air heating before transfer to the rearwall enclosure. The heat transferring liquid medium is preferably conducted through one or more elongated, finned pipes arranged in a ladder network, tortuous path or the like through the interior of the firebox rearwall forming enclosure. This fireplace can be used to either extract or deliver heat from a liquid medium relative to air being passed through the enclosures.

In another aspect of this invention, an air flow guiding enclosure which forms a combustion box such as the aforementioned fireplace structure has the liquid medium circulating means coupled with a storage tank or the like. The liquid medium circulating arrangement is placed within the combustion box forming enclosure where maximum heat exchanging relation is established with air through the enclosure, preferably including the portion of the enclosure in proximity to the air exhausting arrangement for the enclosure. Storage of excess combustion heat and subsequent use thereof is realized by causing the cool liquid medium to be transferred from the storage to the circulating arrangement in the enclosure during combustion with heated liquid medium being transferrable to the fireplace or other heat delivery device at other times. The excess heat extraction in the fireplace during combustion can be obtained to the effective exclusion of or concurrently with warm air release into the closed environment from the fireplace via heatolator type operation.

Yet another aspect of the present invention is the integration of various elements into an overall closed environment heating system. Thus the fireplace can be used during the time of combustion to warm air for release to the closed environment either with or without liquid medium heating. The liquid medium warmed in the heat exchanger can be delivered either to storage or to remote heat radiator type devices. Further, such a system is adaptable to use the stored, warm liquid medium to warm air in the fireplace enclosure for release into the closed environment with or without concurrent warm liquid medium delivery to remote heat radiators. Such a system is readily adaptable for cooperative integration with other heat conservation subsystems or elements like solar collectors, etc.

Still another feature of this invention is a unique storage tank which stratifies the stored liquid medium in a manner wherein efficient usage of the liquid medium is obtained in cooperation with heat storing and distributing systems such as that mentioned above. The tank includes a pair of baffle plates arranged in generally horizontal but diverging relation across the width of the tank interior at a vertically intermediate location of the tank. The plates are suspended so that there is a small clearance between the outer edges thereof and the tank walls. Liquid medium is introduced to the tank in an inward direction between the plates in proximity to the smallest separation between the plates. By this configuration, input medium that is warmer than the upper tank region will rise and increase the upper tank region temperature and vice versa for cool medium relative to the lower region. This minimizes heat transfer through turbulence as well as from normal convection so that warm medium can be removed from the upper portion of the tank and cooler medium from the lower portion.

The foregoing and other objects, features, aspects, applications and advantages of the present invention will be more readily apparent in view of the following detailed description of the exemplary preferred embodiments taken in conjunction with the accompanying drawings.

DETAILED DESCRIPTION OF THE PREFERRED EMBODIMENTS

Figure 1:
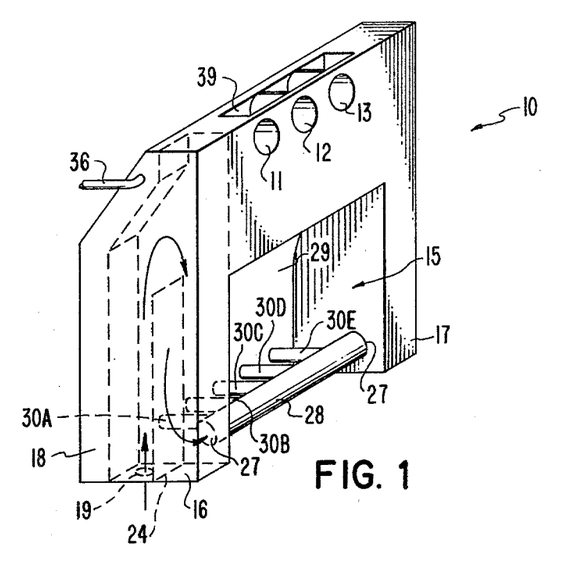
FIG. 1 is a perspective view of a fireplace in accordance with this invention.

FIG. 1 shows a perspective view of a double-walled and partitioned heatolator type of fireplace 10 in accordance with the present invention. As with conventional such fireplaces, cool air can be passed through the interior of the jacket and exhausted through outlets 11, 12 and 13 as warm air whenever a fire is present in firebox 15. A greater or lesser number of exhaust outlets and different firebox exit locations therefor can be used and additional ducting to exhaust warm air in remote locations can be included. Firebox 15 is formed by heat conducting walls of side enclosures 16 and 17 and rear enclosure 18 (note FIGS. 2 and 3).

Figure 2:
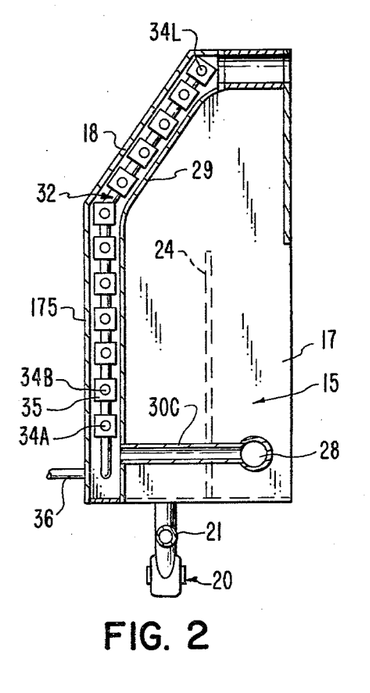
FIG. 2 is a side section view taken through the middle of the FIG. 1 fireplace and as indicated at 2—2 in FIG. 3.
Figure 3:
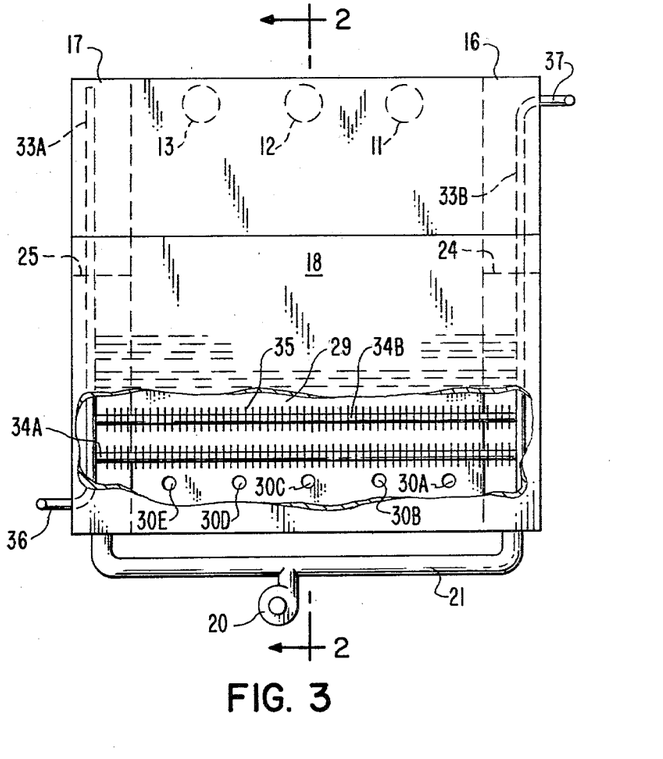
FIG. 3 is a rear, partially broken and sectioned view of the FIG. 1 fireplace.

Cool air is introduced to side enclosures 16 and 17 as through entry port 19 for enclosure 16 under the impetus of blower 20 and split distributor manifold 21 (note FIGS. 2 and 3) although air circulation can be obtained from separate blowers for each side enclosure or other means such as normal heated air flow from natural convection. That is, blower 20 need not always be turned on. Further, it will be understood that multiple blowers can be used with appropriate modifications of the air ducting. In the exemplary preferred embodiments as shown in FIGS. 1–3, cool air is introduced to side enclosures 16 and 17 from split manifold 21 and forced to travel upwardly over baffle plates 24 and 25 and thence downwardly to exit at ports 26 and 27 on the opposite ends of hollow tubular member 28. This somewhat tortuous air flow path as indicated by the arrows for side enclosure 16 in FIG. 1 ensures that maximum exposure of the cool air to heat input from the firebox 15 sidewalls is obtained.

The tubular member 28 is interiorly coupled to transverse tubular members 30A–30E which open into rear enclosure 18. Thus when a fire is present in firebox 15, air initially warmed during passage through side enclosures 16 and 17 is further heated by its passage through the network of holloww tubes 28 and 30A–30E before introduction to enclosure 18 since this tubular network is located directly in the combustion area of firebox 15. As the air passes through the interior of enclosure 18 on its way to outlets 11–13, it is further warmed by exposure to heat conducting rear wall 29. It will be understood that greater or lesser numbers of tubes can be used to make up the firebox network instead of the single tube 28 and five transverse tubes 30. It has been found that between twelve and fourteen transverse tubes 30 in a typical firebox provide excellent air heating without undue interference with normal use and access for firebox 15.

Located within rear enclosure 18 is a heat exchanger 32 comprised of vertical stanchion pipes 33A and 33B interconnected in a ladder network by a plurality of heat conducting pipes 34A–34L. Each pipe 34 has a multiplicity of heat conducting fins such as 35 attached thereto in heat transferring relation. Note that exchanger 32 could be otherwise formed such as by a pipe or pipes bent or coupled into a tortuous or serpentine path through the interior of enclosure 18 including a multiplicity of generally horizontal and/or vertical sections. Preferably heat exchanger 32 includes as many horizontal or vertical courses of finned pipes packed as tightly together as possible within the firebox surrounding enclosure. Accordingly, by introducing a cool liquid medium such as water to connector 36 and forcing it through heat exchanger 32, and substantial amount of heat energy is extracted from the fireplace and is available at outlet 37 for storage or use at another location. The heating of water in exchanger 32 can be further augmented through clamps (not shown) attached between the inner walls of firebox 15 and the pipe and/or by the thermal contact of the fins with the firebox 15 walls as is described later for FIG. 12.

Because of the heat exchanger 32 and tortuous air path through the firebox 15 surrounding jacket, two significant advantageous functions become available. First, an efficient supply of heated water is produced when there is a fire in firebox 15. At any time that it is not necessary to deliver all the heat to outlets 11–13, a circulating pump can be energised to transfer the heated water to storage, more remote heat radiators or the like.

The second advantageous function is that fireplace 10 can use stored hot water to supply heat to the house or building. In this mode of operation, the fin tubes 34 function to conduct heat away from the hot water in the tubes to heat the surrounding air. This works as follows: When no fire is burning, but the room thermostat calls for heat, water from storage is pumped through the finned tube heat exchanger 32 while simultaneously circulating cool air from the house through the interwall space of the firebox. There can be ducting and a blower to draw this cold air from the coldest parts of the house (e.g.: entry, patio door, basement, etc.). Thus the fins will conduct heat from the water into the cool air which is then resupplied in heated form to the house. In other words, fireplace 10 operates (1) as a forced air heating system, drawing heat from the fire and delivering it directly to the house, (2) as a hot water heater drawing heat from the fire via circulating water for storage or use at another location, and (3) as a heat output device in the absence of a fire, drawing heat from storage and delivering it to the house.

These fireplaces using forty feet of fin tube elements in heat exchanger 32 operate at 70% efficiency when hot air and hot water are withdrawn simultaneously. They have an output capacity of 120,000 Btu per hour of useful heat for space heating and storage. When used with a 600 cfm blower (0.4" SP) in the fireless heat exchanging mode, these fireplaces deliver 5,000 Btu per hour per 10° F. temperature differential between water and incoming air. Waterflow is provided by circulating pump of typically from 2 to 3 gpm in a stand-alone system to 6 gpm or more for use with an electrohydronic system for baseboard heat depending on the number of activated zone valves.

Note that by placing heat exchanger 32 throughout the interior of rear enclosure 18 and particularly in proximity to outlets 11–13, the maximum heat is available for transfer into the water. Of course pipes 33 and/or 34 could be extended into either or both of side enclosures 16 and 17 to further augment heat transfer. Furthermore, direct connecting ports between side enclosures 16 and 17 and rear enclosure 18 can be included if desired. Additionally, such connecting ports could be gated to be open when heat is being extracted from exchanger 32 and closed when a fire is present in firebox 15. Fireplace 10 includes a flue opening 39 for combustion gases as is conventional.

Figure 4:
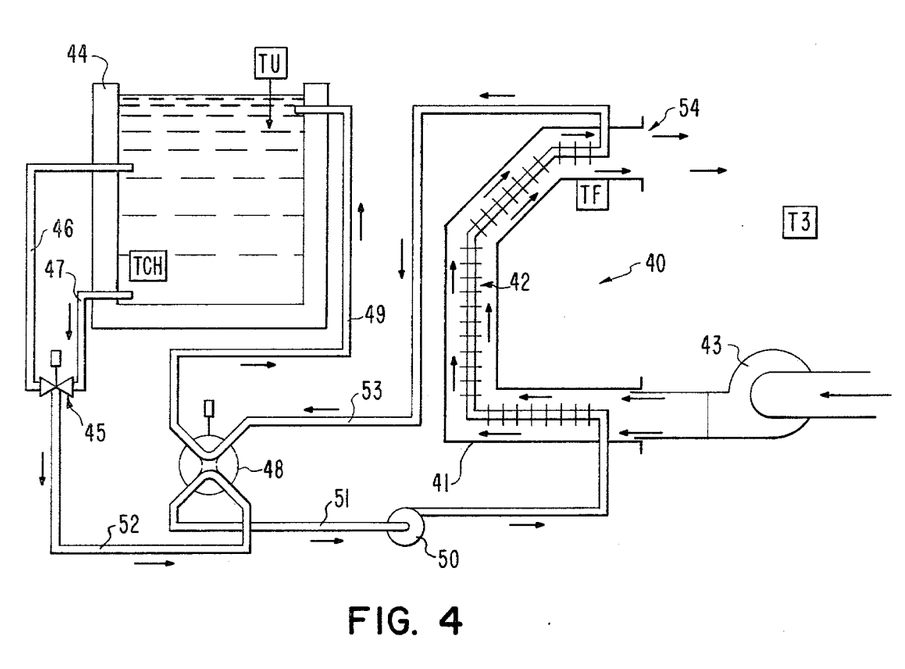
FIG. 4 is a partially schematic view of a bidirectional heat transferring system including a fireplace type of heat exchanger.

A schematic flow diagram for a basic heat distributing and storing system using a fireplace such as that just described is presented in FIG. 4. The fireplace 40 includes a firebox enclosing jacket 41 with its internal heat exchanger 42 and blower 43. Storage tank 44 is coupled for fluidic communication with heat exchanger 42 through three-way valve 45 with its input connectors 46 and 47 and four-way valve 48 with its tank connection 49. Note that valve 45 and line 46 are primarily for use when tank 44 is constructed in accordance with the baffle plate configuration shown and described in FIGS. 7–9 below. Thus only a direct connection from line 47 to line 52 need be used if tank 44 is a more conventional structure.

Circulating pump 50 connects to valve 48 through pipe 51 to pull cool water from connector 52 for delivery to exchanger 42 and return via connectors 53 and 49 as warm water when valve 48 is set as shown. With valve 48 switched, warm water is drawn through pipes 49 and 51, pump 50 and returned through pipes 53 and 52 as cool water after surrender of the stored heat in exchanger 42.

Valves 45 and 48 can be operated manually or by automatic controls. When an automatic valve control is used, fireplace temperature sensor TF indicates presence or absence of a fire in fireplace 40. Detection of a fire causes valve 45 to be set to deliver the coldest water from connector 47 to pump 50, valve 48 to be set as shown and water to be passed through heat exchanger 42 and thence to return via pipe 49. Pump 50 can be energised under a duty-cycle type of control to maintain the water flow rate such that water delivered to tank 44 from pipe 49 is at a constant temperature such as 140° F. If room thermostat T3 simultaneously calls for heat, air is blown through blower 43 for direct heating from fireplace 40 and augmenting of the heat content of the air at the exhaust port 54 by the increased air flow volume.

When heat is to be extracted from storage 44 as when TF senses absence of a fire in fireplace 40, valve 48 is set to deliver warm water from pipe 49 to pump 50 and to return water vi connectors 53, 52 and 47. If room thermostat T3 calls for heat and the warm region temperature sensor TU detects that the upper region water temperature is adequate (ie: 80° F. or better), pump 50 is energised to circulate the warm water through heat exchanger 42 while blower 43 is turned on to circulate air over exchanger 42 thereby producing warm air at outlet 54. As mentioned, connector pipe 46 and three-way valve 45 are useful when storage tank 44 is configured in accordance with the tank of FIGS. 7–9. The lower level temperature in tank 44 is detected by the thermostat TCH which can be used as appropriate such as for reducing heat storage when the entire tank contents is warmed. The FIG. 4 structure is well suited to operate as a stand-alone system or to be integrated with other subsystems such as those shown in FIGS. 5 and 10.

Figure 5:
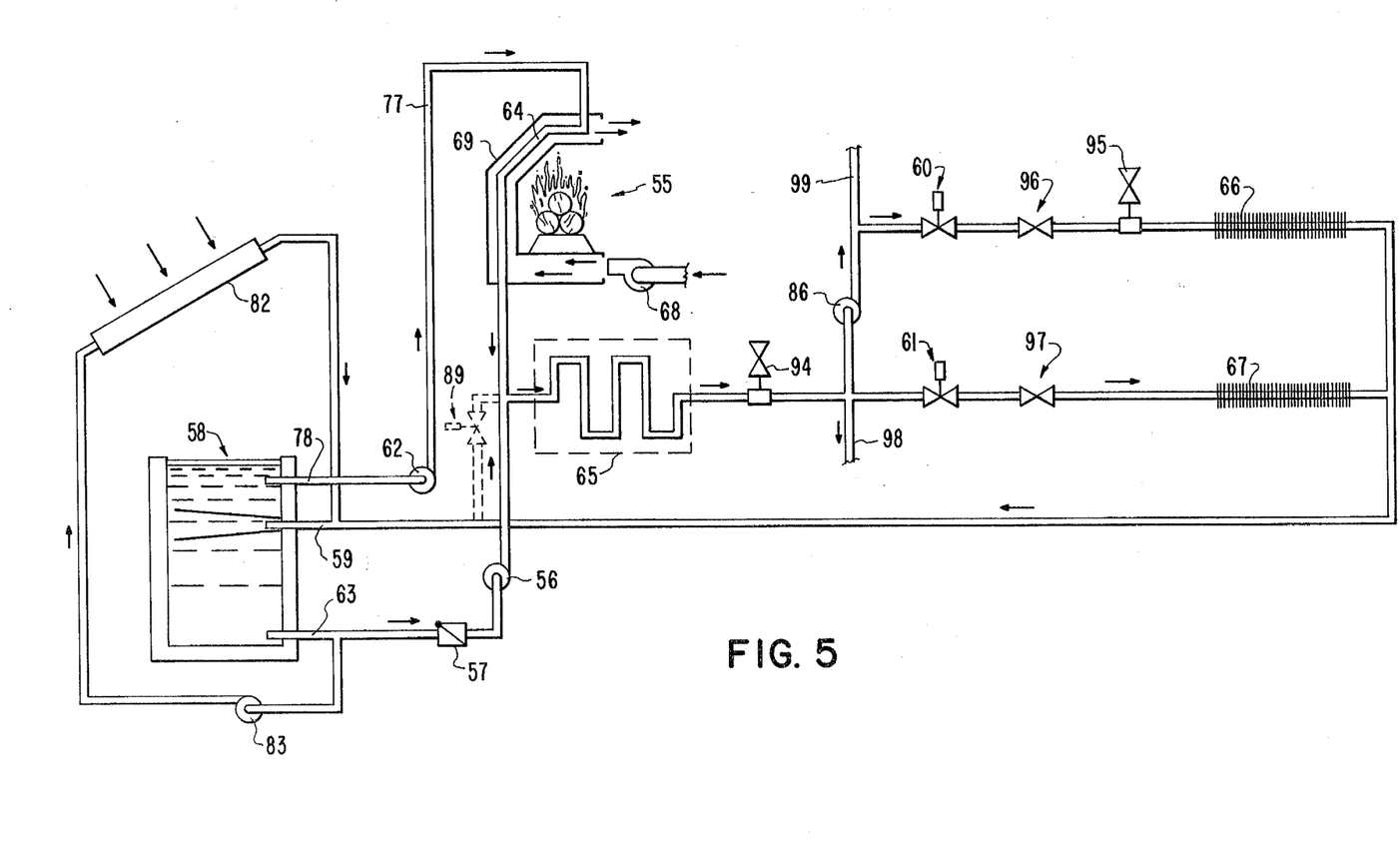
FIG. 5 is a generally schematic view of an integrated heat storing and distributing system in accordance with the invention.

FIG. 5 is a schematic diagram illustrating integration of the fireplace 55 with other subsystems into a general heat distributing system for a home, building or other closed environment. As shown in FIG. 5, a recirculating pump 56 and check valve 57 are employed in cooperation with the other subsystems so that the three and four way valves of FIG. 4 are not needed. Pump 56 can be a small device such as a 3 gpm at nine feet head and 1/12 HP. It can be controlled by a time proportioning, temperature differential control circuit similar to that shown and described later for FIG. 11. Storage tank 58 is shown in the FIGS. 7-9 configuration.

The FIG. 5 system has two general operating modes: the first is the space heating mode when a room thermostat calls for heat, and the second is the storage mode when a fire is burning but no space heating is needed.

The system is in space heating mode whenever a room thermostat calls for heat. The corresponding zone valve 60 or 61 will be energised and its endswitch will activate the circulating pump 62. In this condition the fireplace storage pump 56 is deenergised even if there is a fire in the fireplace 55. Thus water from the top of storage 58 is circulated through the heat distribution loop. The water passes first through the fireplace fan-coil 64, then through the electric boiler 65 and finally through the baseboard elements 66 and/or 67 of the zone or zones calling for heat. Unintended diversion of the warm water to the bottom of storage 58 is prevented by check valve 57. Blower 68 of the fireplace fan coil is activated only if the call for heat is from the thermostat which controls the zone in which the fireplace 55 is located. This avoids overheating of that zone.

The space heating operational mode can occur under three sets of conditions. The first condition is when fireplace 55 is in use. Fireplace heat then preheats the water before it reaches the electric boiler 65 (which will hardly ever be energised in this condition) and the baseboard elements 66 and 67. As a result, this heat will be transferred to those areas of the house where it is needed; any surplus being delivered to storage tank 58. In addition, forced air through the fireplace jacket 69 delivers heat to the house if heat is called for by a thermostat in the environment area of fireplace 55.

The second space heating mode condition is when fireplace 55 is not in use. Water from the warmest region of the storage tank 58 is circulated through the heat distribution loop. If a heat demand is sensed by the thermostat in the environs of fireplace 55, the fan-coil blower 68 is also activated for increased heat delivery. The contribution from this fan-coil heat exchanger 64 becomes increasingly important for lower storage temperatures.

The third space heating mode condition is when there is need for back-up heat from electric boiler 65. All zone thermostats (ie: 70 and 73 in FIG. 6) are two-stage thermostats. Electric boiler 65 is automatically actuated for back-up only when heat from storage 58 and fireplace 55 is not sufficient to maintain a prelected minimum comfort level which is controlled by the second stage (ie: 72 and 75 in FIG. 6) with the first stage (71 and 74 in FIG. 6) controlling optimum comfort level.

Figure 6:
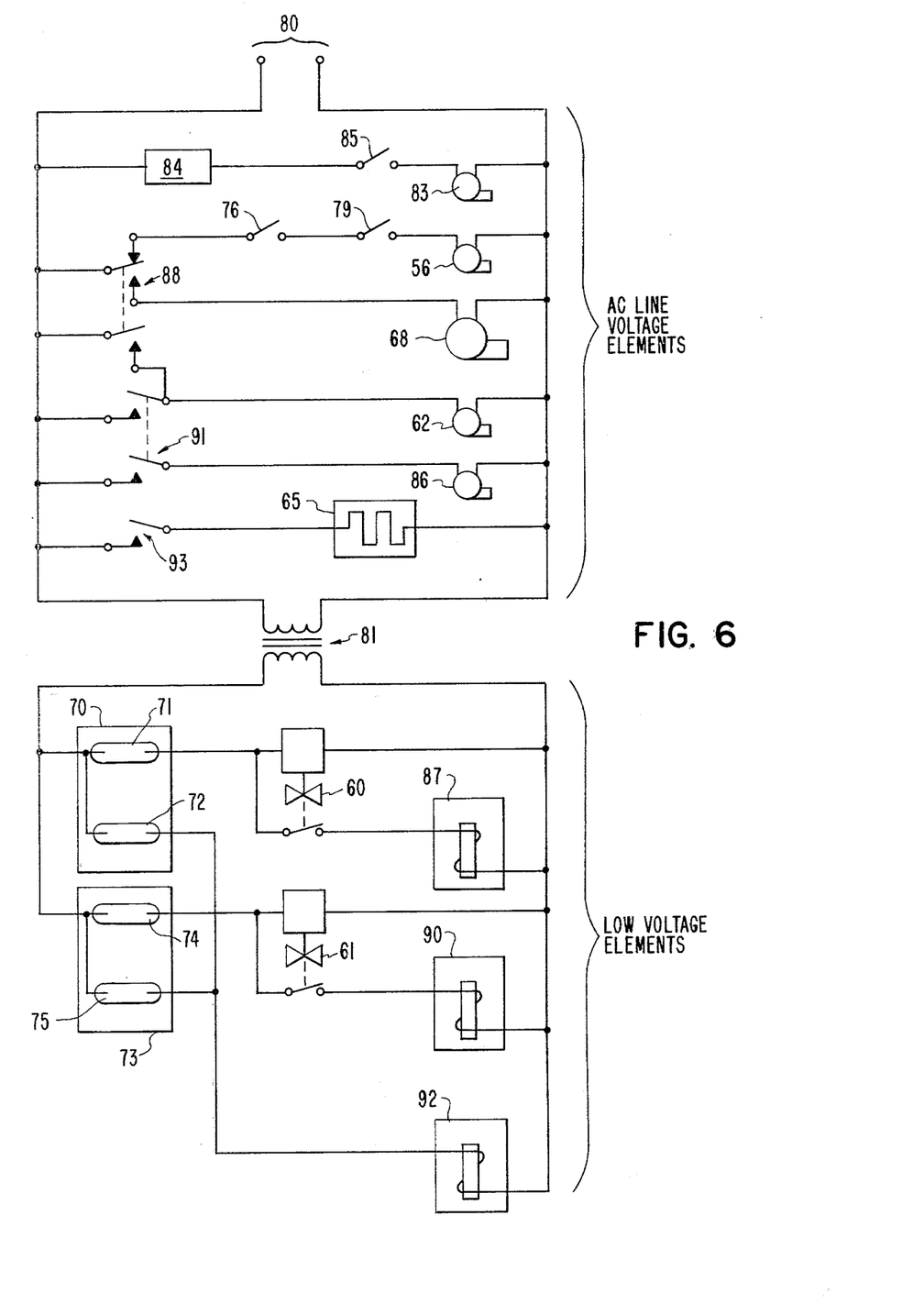
FIG. 6 is an electrical schematic of typical control elements associated with the FIG. 5 system.

Operation of the FIGS. 5 and 6 system can best be understood by an example. Assume room thermostats 70 and/or 73 are set for the first with the first stage 71 and 74 at 70° F. as the optimum level and the second stage 72 and 75 minimum comfort level being set for 2° F. lower. The system automatically enters the heating modes described above when the room temperature falls below 70° F. Auxiliary heat as from electric boiler 65 is not activated at this stage, and the system relies entirely on heat from storage 58 and fireplace 55 for optimum level heat maintenance. Should the room temperature drop by 2° F. below the optimum setting, electric boiler 65 is automatically actuated to prevent further room temperature decrease. Usage of the auxiliary back-up heat from electric boiler 65 is minimumized.

The second FIG. 5 operational mode is the storage mode. As was stated earlier, pump 56 can be energised only when none of the room thermostats call for heat. Additionally, the temperature in fireplace fintubes 64 must be above a preselected level such as 140° F. for pump 56 to be actuated. For this purpose, a simple bimetal switch 76 (FIG. 6) is installed with fintube 64. Note that a time proportioning pump speed controller could be used in place of switch 76 and can be configured along the lines of the FIG. 11 circuit. Fireplace storage pump 56 starts pumping when no space heating is needed but water of 140° F. or greater is available from fireplace 55. Zone valves 60 and 61 are closed in this condition and the flow passes in reverse direction through pipes 77 and 78 from the arrows as shown in FIG. 5. Therefore cool water passes through fireplace 55 where it is heated to 140° F. or higher and then through circulating pump 62 into the top of tank 58. Circulating pump 62 is an open impeller design so the reverse flow of only 2 to 3 gpm typically passes readily (ie: no large dynamic head). The basic design can work with closed impeller pumps if a bypass valve is provided. High temperature limit switch 79 (FIG. 6) is provided at the bottom of tank 58 to shut off pump 56 if the water temperature at the tank bottom reaches 140° F. This is necessary since water can be heated by 30° F. when passing fireplace 55 at a flow rate of 2-3 gpm.

It should be noted that the rear inside surface of fire box 55 where fintube 64 is barely heats up in the fan-coil operating mode. Thus heat losses from this surface into the chimney are rather minimal in this operating mode. They are, for example, 240 Btu's per hour under the following conditions: outside temperature of 35° F., chimney damper full open, 140° F. water supplied to fintube 64 inlet, 65° F. air supplied by blower 68 to the fireplace jacket.

If fireplace 55 is to used as a heat delivering device independently of other heat radiator elements, bypass valve 89 can be included as shown dotted in FIG. 5. A thermostat (not shown) in the environment of fireplace 55 can be arranged to turn on pump 62 to deliver warm water into heat exchanger 64. With no heat demand in areas associated with radiators 66 and 67, the thermostat near fireplace 55 can also be enabled to actuate bypass valve 89. This provides a cool water return into line 59 until such time as valve 60 or 61 is opened thereby providing a direct return to tank 58 via inlet 59. Of course the system can be further adapted if desired to deliver cool water from pump 56 to exchanger 64 for heating in fireplace 55 followed by delivery to radiators 66 and/or 67 and thence return via connector 59.

The electrical schematic of FIG. 6 is straightforward and relatively self-explanatory. Main line AC power is connected at input 80 and appropriately reduced through transformer 81 for low voltage requirements such as for thermostat (eg: 24 VAC). The FIG. 5 system is shown including a solar collector 82 connected through its circulating pump 83 to augment the heat in storage 58. A vacuum break (not shown) at collector 82 and a check valve (also not shown) in the collector 82 output line can be included to allow drainage of collector 82 as needed without impacting operation of the remainder of the system. Thus in FIG. 6 a temperature differential controller 84 similar to the FIG. 11 circuit is shown arranged to control pump 83. In addition, a high temperature limit switch 85 is included to avoid overheating of the water in tank 58. Relay 87 is the circulating pump relay which controls contacts 88 whereas booster pump relay 90 controls contacts 91. Electric boiler 65 is controlled by relay coil 92 which determines the open/close state of its contacts 93. In FIG. 5, air vents 94 and 95 as well as balance valves 96 and 97 are conventional. Also additional lower level heat zones can be connected to pipe 98 whereas further upper level zones can attach to connector 99.

Figure 7:
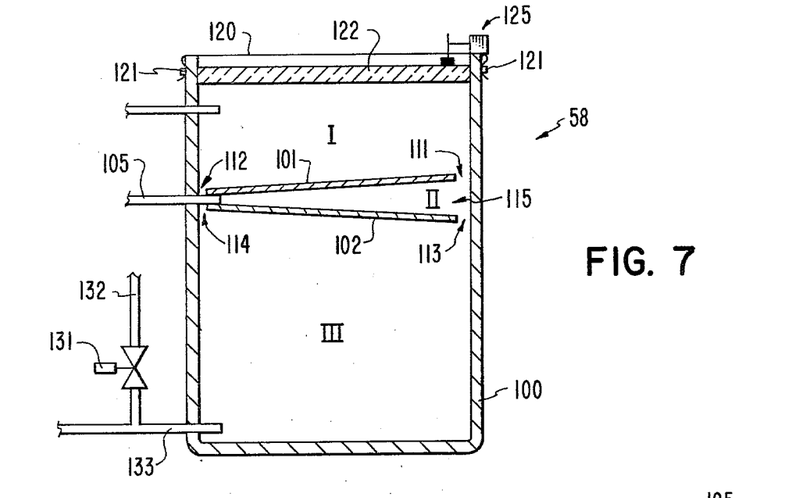
FIG. 7 is a side sectioned view of a liquid medium storage tank in accordance with one feature of the invention.
Figure 8:
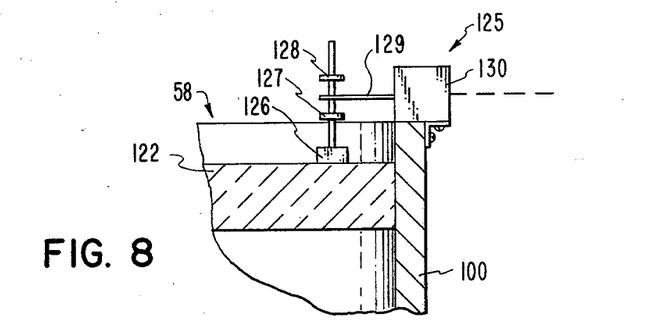
FIG. 8 is an enlarged view of the level control apparatus for the storage tank of FIG. 7.
Figure 9:
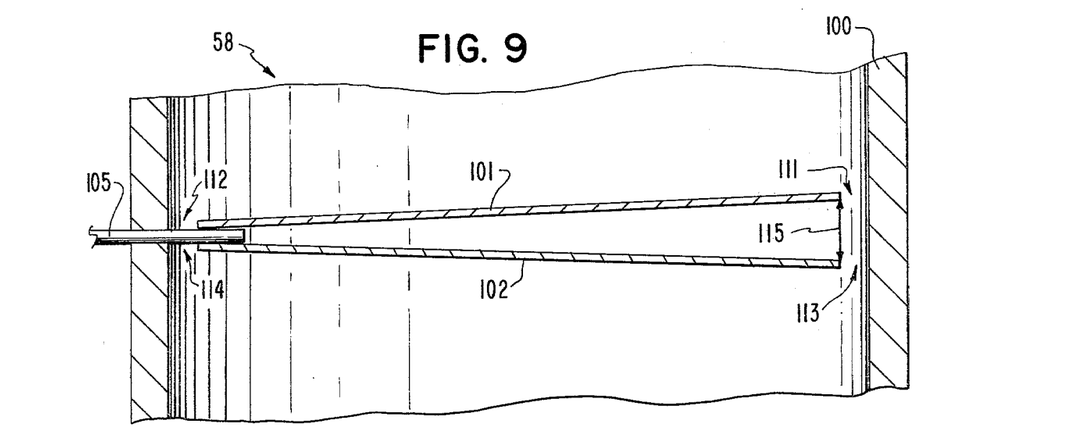
FIG. 9 is an enlarged view of the divergent baffles in the storage tank of FIG. 7.

The type of storage tank 58 shown as an exemplary element in the FIG. 5 system is shown in greater detail in FIGS. 7-9. Tank 58 is highly efficient for stored water temperature stratification within wall 100 by means of baffle plates 101 and 102.

These baffles 101 and 102 transform tank 58 from a heat-storing device into a heat-storing and temperature stratifying system which efficiently separates useful hot water from already used or cooler water, the reason for this being the channeling according to temperature of all water entering the system. This may be water that has been returned cooled because of space heat usage or water returned warmed by the fireplace or solar collector. An open tank without baffles will also exhibit some temperature stratification but the amount remains modest because of two processes. First, as water enters the tank, it generates turbulence causing mixing at all levels and tending to equalize temperatures throughout the tank. Second, conductive and radiative heat exchange between different levels continuously cools the warmer levels while warming the cooler levels. Again the tendancy is towards temperature equalization throughout the tank 58.

The baffle system of this invention greatly improves the temperature stratifying performance of tank 58 by minimizing the effects of the two processes mentioned above. Water enters the tank between baffles 101 and 102 at input 105. The baffles prevent mixing of this water with tank water in Region I (hot) or Region III (cool). As water spreads over the entire area between baffles 101 and 102 (about twenty-eight square feet, for example), it will reach the edges of the baffles in a very slow laminar flow resulting in clearly defined channeling of water into Region I whenever the water is introduced at a temperature above the water present in Region I. Once the water has been efficiently channeled, the baffles 101 and 102 minimize conduction or radiation of heat between layers. Baffles 101 and 102 might be constructed, for instance, of aluminum lined urethane foam so the aluminum blocks heat radiation while the urethane foam blocks heat conduction. The vapor barrier prevents deterioration of the foam from waterlogging. The baffles are reinforced and weighted so they will stand up to various forces exerted upon them.

Figure 10:
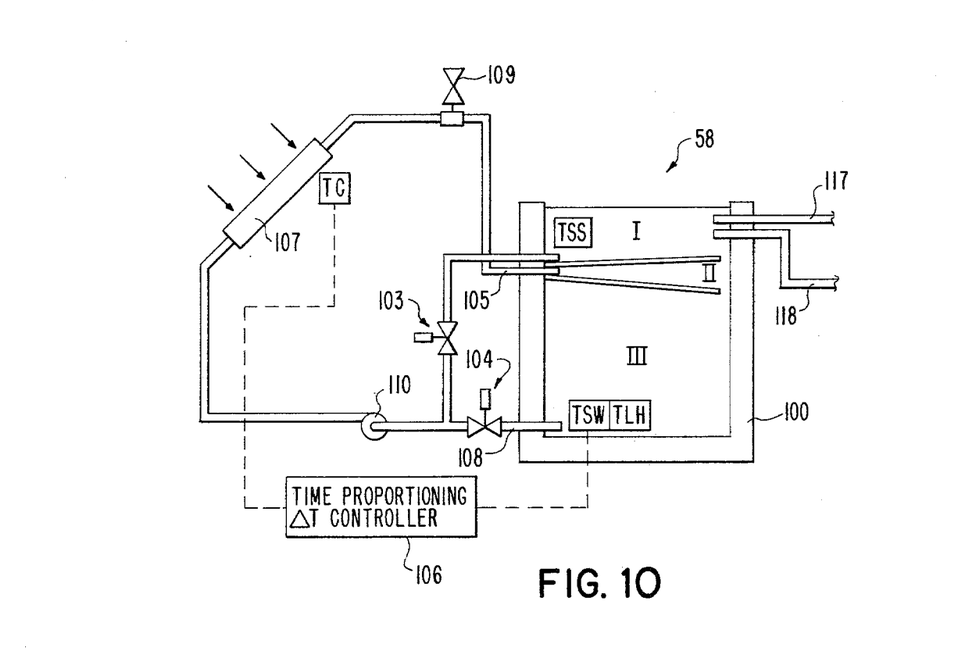
FIG. 10 is a partially schematic view of a heat transfer system with a FIG. 7 type of storage tank as an integral element.

An advantage of the baffled tank of this invention is that it will increase the overall efficiency of the subsystem attached to it. For a typical residence, the storage volume is 1,000 gallons while the baffles are adjusted to provide about 1.2 gallons per squre foot of solar collector. Two manual valves can be provided in the feed to the pump such that Region I will be used exclusively in the summer. The temperature differential controller 106 (note FIG. 10) can be then switched to thermistor TSS. The control circuitry of FIG. 10 is solid state preferably. It can be adapted from the FIG. 11 circuit.

In FIG. 10, to illustrate operation for one switching cycle, assume that collector 107 is dry at a temperature sensed by TC lower than the temperature at the feed 108 to the collector at the bottom of tank 100 as sensed by TS. There are two sensors TSW and TSS for winter and summer operation. A temperature detected at TC 20° F. warmer than TS causes collector pump 110 to operate. Once water is circulating through collector 107, pump 110 remains on even if the TC/TS difference drops below 20° F. until TC is only 5° F. warmer than TS. At that point, duty cycle controller 106 begins time proportioning the power delivered to pump 110. Thus electrical consumption at pump 110 is reduced during periods of moderate insolation whereas the temperature increase across collector 107 is kept at a desired level. When the heat gain from collector 107 drops to only five times (adjustable range) the pump electrical consumption (TC approximately 3° F. above TS at reduced flow rate), controller 106 turns pump 110 off and the cycle starts anew. At this point, water is drained from collector 107 into tank 100. Further storage of heat is prevented whenever high limit switch 85 in FIG. 6 or TLH in FIG. 10 reaches a preselected maximum like 180° F.

In FIG. 10, valves 103 and 104 allow selective bypassing as for summer usage. That is, in warmer weather, valve 103 is opened and valve 104 closed blocking outlet 108 so that only water from the upper region of tank 58 is used. This effectively reduces the storage volume in use when the larger volume is not needed. For instance, the volume used might be reduced from 1,000 gallons to 300 gallons. Vent or vacuum break 109 allows draining of collector 107. Connectors 117 and 118 permit coupling to other system elements such as a fireplace enclosure heat exchanger and auxiliary heat source, respectively, with the returns therefrom (not shown) being coupled into pipe 105.

Again referring to tank 58, it is generally recognised that some temperature stratification occurs in tanks without baffles from density differences of water at different levels and temperatures. However tank 58 of this invention is far superior to non-baffled tanks in that it achieves better temperature stratification and stratification maintenance once achieved. The validity of this efficiency can be demonstrated by some exemplary calculations assuming conditions tending to interfere with stratification more severely than are encountered in actual operating situations.

Rarely will the flow rate of water returned to Region II between baffles 101 and 102 exceed 4 gpm or 924 cubic inches per minute. In this region, water is exhausted and channeled such that it spreads nearly evenly over half the perimeter of the baffle edges which are preferably spaced everywhere equidistant from the interior walls of tank 100. For the example under consideration, this edge spacing 111–114 is assumed to be each two inches from the tank walls. Along this half perimeter (88 inches) the spacing between baffles 101 and 102 varies from two inches at the exit of inlet 105 to six inches at the outer vertical separation 115. Accordingly water exits from between the baffles 101 and 102 through an area of 440 square inches. The average horizontal flow speed of this water is 2.1 inches per minute or 0.035 inches per second when passing the baffle edges.

Assuming a local horizontal flow of 0.2 inches per second which exceeds normal operating conditions, the tendancy to interfere with temperature stratification will be greater than actual conditions. Further, an operating mode that tends to interfere with stratification is chosen, namely the water is assumed to be withdrawn from the bottom of the tank and returned as warmed water between the baffles. The calculations are readily applicable to the inverse withdrawal/return situation. Flow rates and speeds are as stated above and the water is assumed to be at 130° F. at input 105 with Region I being 120° F. Results would be essentially the same with other 10° F. differences.

The 0.2 inch horizontal velocity is combined with a 0.1 inch per second downward velocity component from the water withdrawal of 10 gpm over the entire 364 square inch perimeter gap. The vector addition of only the horizontal and downward components neglects the effects of thermal density differences and the resulting thermal convection. Newton's Second Law (F=ma) suffices to understand how these influences superimpose themselves on the above velocities since viscous forces are negligible at the flow speeds and cross sections here involved. The relative mass change between 120° F. and 130° F. is −0.0026. Thus the buoyant force B that an element of heated water of mass m experiences is:

$$B = mg - (m+0.0026m)g = 0.0026g$$

where g is 32.2 feet/sec.sec.

Viscous forces are proportional to the flow speed. The water viscosity in the temperature ranges here involved is around 0.6 centipoise. A first order approximation using Stoke's Law and a one inch radius shows that for flow speeds below one inch per second the viscous forces are at least two orders of magnitude smaller than the bouyant forces. These influences therefore can be neglected. Upward acceleration on the heated water becomes:

$$a = F/m = -0.0026mg/m = -0.0026g = 1 \text{ in./sec.sec.}$$

The following table shows the second by second motion of an element of water which reaches the baffle edge under the conditions described:

| T | H.D. | DVD | UVD | TUD |
|---|------|-----|-----|-----|
| 0 | 0    | 0   | 0   | 0   |
| 1 | 0.2  | 0.1 | 0.5 | 0.4 |
| 2 | 0.4  | 0.2 | 2   | 1.8 |
| 3 | 0.6  | 0.3 | 4.5 | 4.2 |
| 4 | 0.8  | 0.4 | 8   | 7.6 | where T is time in seconds, H.D. is the horizontal distance due to 0.2 inches/sec., DVD is the downward vertical distance due to downward speed of 0.1 inches/sec., UVD is the upward vertical distance due to upward acceleration, and TUD is the total or combined upward distance, all distances being in inches.

At four seconds and beyond, viscous forces increase to about 1/10th the bouyant forces but is immaterial as the water has then risen well above the upper baffle at that point. Actual operating conditions are such that rising of the heated water is even more steep than the calculations suggest. The cooler water in Region I being displaced by this rising warmer water escapes into the lower Region III through the opposite half of the perimeter gap between baffles and tank walls, namely around the gaps 112 and 114.

Within measurement errors, an experiment using colloidal tracers in an aquarium with baffles and 130° F. water introduced into 120° F. water confirmed the above calculation results.

Tank 58 in a typical, practical example is five feet in diameter and seven feet high. Baffles 101 and 102 are vertically separated by two inches at their closest edges and diverge to six inches at their greatest separation (ie: gap 115). Baffles 101 and 102 are suspended for a two inch gap everywhere between their edges and the inside walls of tank 100. A Hypalon vapor barrier 120 sealed the top of the tank 100 and is held in place at the perimeter of tank 100 by a neoprene gasket and banding strap 121. Tank 100 is prefabricated fiberglass or an inexpensive precast and reinforced concrete structure. A concrete tank would be sealed on the inside with any vapor seal such as Elastron with the walls being thermally insulated on the outside. Cover 122 is a floating, vapor-sealed urethane foam lid and baffles 101 and 102 consist of vapor sealed (eg: Elastron) urethane foam sheets.

As can be seen in FIGS. 7 and 8, a float switch 125 employs a vertically movable weight element 126 with shoulders 127 and 128 arranged to follow lid 122. By this, actuator arm 129 controls solenoid actuator 130 to maintain the fill level within tank 100. Actuator 130 controls valve 131 (FIG. 7) so that water from fill line 132 selectably enters tank 100 via inlet 133.

Figures 11, 12:
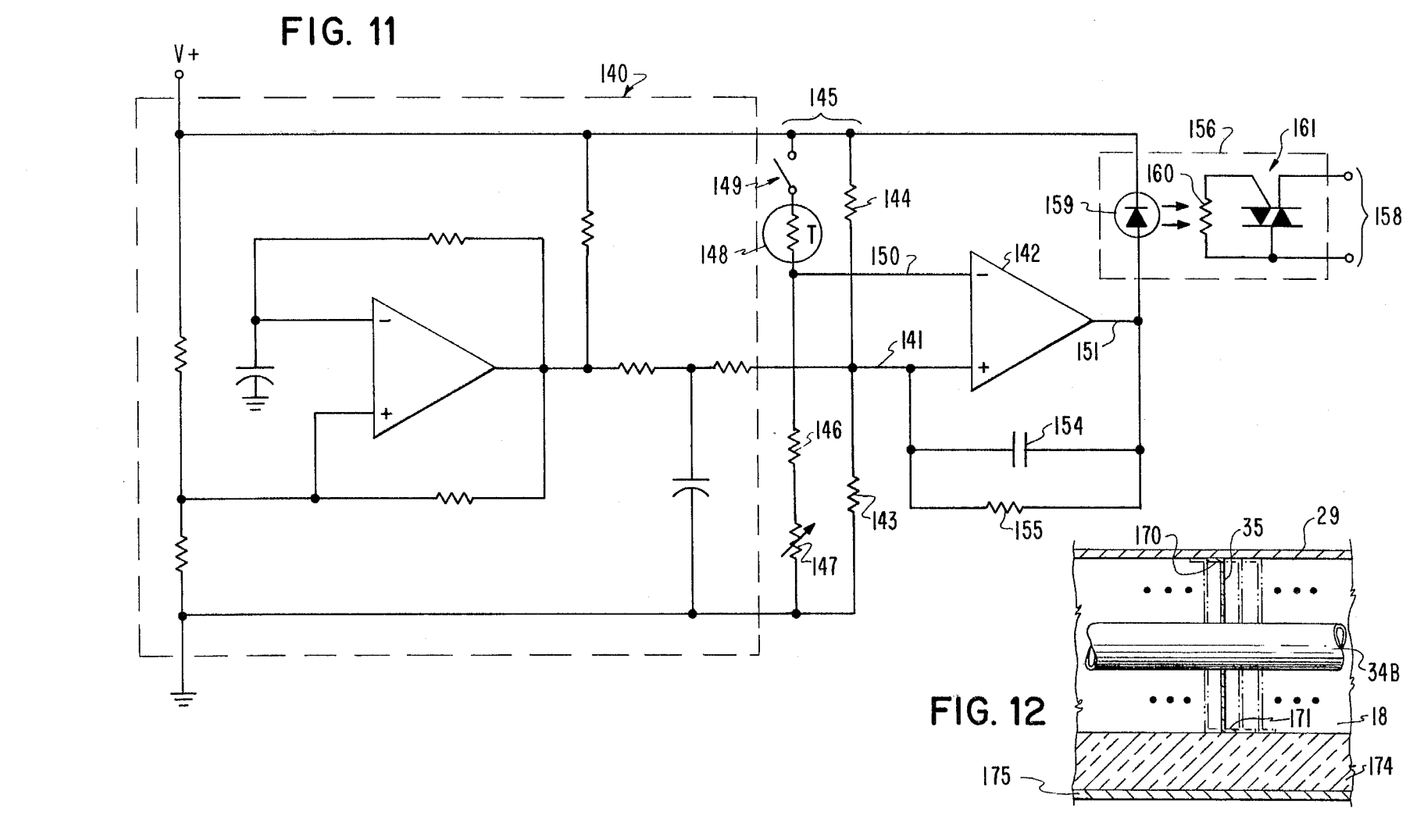
FIG. 11 is an electrical schematic diagram of a typical time proportioning, temperature responsive control circuit useful for various control functions associated with the present invention.
FIG. 12 is a partially sectioned view looking downward on a typical finned pipe heat exchanger element.

FIG. 11 is an electrical schematic diagram of a typical time proportioning, temperature responsive controller. This circuit is particularly useful and adaptable for duty-cycle controlling many of the circulating pumps mentioned herein, examples being pump 50 in FIG. 4, pumps 56, 62 and 83 in FIG. 5 and pump 110 in FIG. 10.

The components in box 140 are arranged to operate as a free-running sawtooth generator in a conventional manner. This sawtooth output at line 141 is connected as one input to comparator 142. Also coupled into input 141 of comparator 142 are resistors 143 and 144 which form one leg of bridge circuit 145. The other leg of bridge 145 is formed by fixed resistor 146, variable resistance 147, temperature sensing thermistor 148 and limit switch 149 which are connected to provide input 150 to comparator 142. Output 151 of comparator 142 is coupled to input 141 through the feedback network of capacitor 154 and resistor 155. Output 151 is also coupled to output circuit 156 to provide an electrically isolated output switching signal at load output 158. That is, light source 159 (eg: a light emitting diode or LED) responds to output 151 current by illuminating photosensitive resistor 160 so as to cause the high power semiconductor switch 161 (eg: a triac) to open or close the circuit between load terminals 158. Thus load output switch 158 is typically connected in series with the primary power source and a pump so that the pump is only on when the semiconductor switch 161 is conducting.

In operation, the comparator 142 continuously compares the sawtooth varying voltage at input 141 with the voltage developed at input 150, the latter voltage being proportional to the resistance of thermistor 148 as determined by the temperature of the environment of thermistor 148. Accordingly, an output 151 current is introduced to LED 159 and thus switch 156 for the period of sawtooth 141 voltage that exceeds the input 150 voltage. The period of time that switch 156 is closed (or triac 161 is conducting) can vary from zero to 100% of the cycle time for each sawtooth. As a result, the "on" time for the pump controlled by output 158 is proportioned to the temperature sensed by thermistor 148. Note that when the resistance of thermistor 148 is high and/or limit limit switch 149 is open as shown, no current is produced at output 151 and the pump is off.

To employ the FIG. 11 circuit as a temperature differential controller wherein the pump is to be turned on only when there is a particular difference of temperatures between two locations, another thermistor (not shown) would be included in series with or in place of resistors 146 and 147. The input 150 voltage then represents the difference between the two temperatures being detected.

FIG. 12 is a partially sectioned view of heat exchanger 32 pipe 34B of FIGS. 2 and 3 taken looking downward into rear enclosure 18. To augment both heating of the air passing through enclosure 18 (which would be moving perpendicularly upward from the plane of the drawing of FIG. 12) as well as heat transfer into the liquid medium passing through pipe 34B, each fin such as 35 has a bent edge or lip 170 which abuts rear wall 29 of the firebox. A similar lip on the other edge of fin 35 abuts insulator panel 174 which fills the space between between lip 171 and back cover 175. The horizontal section of fin 35 is therefore a "Z" configuration due to transverse and oppositely extending lips 170 and 171. Thus a good thermal path is established into and out of pipe 34B to firewall 29 via fin 35 for transferring heat from the firebox to the air passing through the enclosure and/or the liquid medium passing through pipe 34B. Conversely, when no fire is in the firebox and warm water is being pumped through pipe 34B, fin 35 substantially augments transfer of the heat from the water to the air passing through enclosure 18.

In a typical embodiment, the spacing between walls 29 and 175 is four inches with insulator blanket 174 being one inch of fiberglass, fins such as 35 being three inches between lips 170 and 171 which extend about ¼th inch each and pipe 34B being of three-fourths inch diameter.

Although the present invention has been described with particularity relative to the foregoing detailed description of the exemplary preferred embodiments, various modifications, additions, changes and applications in addition to those specifically mentioned herein will be readily apparent to those having normal skill in the art without departing from the spirit of this invention.

What is claimed is:

1. A fireplace heat exchanger comprising:

first and second hollow enclosures each having a heat conducting wall with said walls arranged for forming the sidewalls of a firebox, each said enclosure including an air entry port and an air exit port, means for introducing cool air to said entry ports, each said enclosure being internally arranged for guiding the air from said entry port over a substantial portion of said firebox sidewall thereof and thence to said exit port, a third enclosure having a heat conducting wall arranged contiguous with said first and second enclosure walls for forming the rear wall of the firebox, said third enclosure including air input means in the lower portion thereof and air exhausting means in the upper portion thereof, a network of hollow elongated members of heat conducting material for establishing air communication between said first and second enclosure exit ports and said third enclosure air input means with said network being arrayed through the combustion area of the firebox, an elongated pipe of heat conducting material formed in a path traversing the substantial internal width of said third enclosure, a plurality of heat conducting fins arranged in heat transfer relation along said pipe, and means coupled through the exterior of said third enclosure for passing heat transferring liquid through said pipe.

* * * * *